May 20, 1969 D. R. KOEHLER ET AL 3,445,591
GENERATOR OF MATHEMATICALLY RANDOM ENTITIES
Filed Jan. 4, 1966
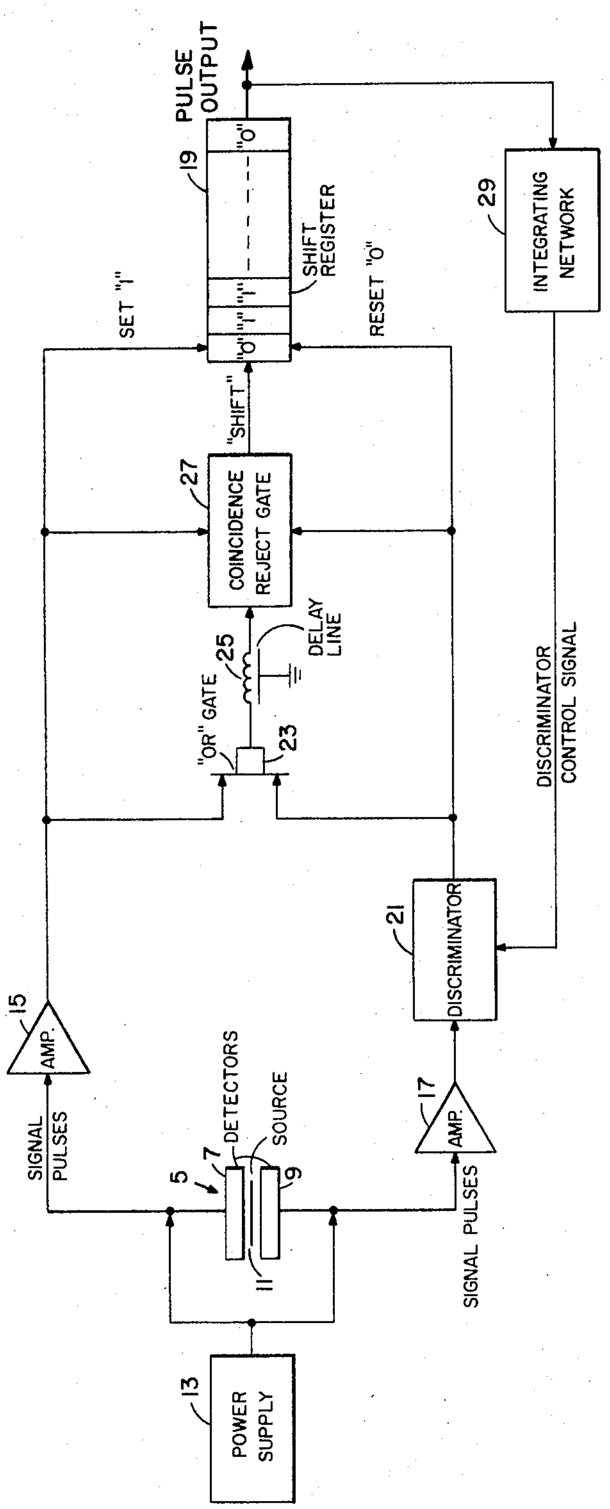
Dale R. Koehler
John T. Grissom
Robert G. Polk,
INVENTORS.
Harry M. Saragovitz
BY Edward J. Kelly
Herbert Berl
Jack W. Voigt United States Patent Office 3,445,591
Patented May 20, 1969

3,445,591

GENERATOR OF MATHEMATICALLY RANDOM ENTITIES

Dale R. Koehler, 2208 Sockwell Drive, Huntsville, Ala. 35803; John T. Grissom, 4809 Cottonwood Drive, Huntsville, Ala. 35810; and Robert G. Polk, 3013 Bayless Drive, Huntsville, Ala. 35805

Filed Jan. 4, 1966, Ser. No. 518,733
Int. Cl. H04l 9/00; H03b 29/00
U.S. Cl. 178—22 3 Claims

ABSTRACT OF THE DISCLOSURE

Random numbers or pulses are generated by a system for detecting occurrences of some natural stochastic physical process, such as radioactive decay, white noise, etc. The detected occurrences act as signal inputs to a shift register. The settings of the stages of shift register, at any chosen time, is a random number, and the output of the shift register is random pulses.

The invention described herein may be manufactured and used by or for the Government for governmental purposes without the payment of any royalty thereon.

In the use of digital and analog computers in the analysis of physical theory involving stochastic (random) variables, a problem of considerable magnitude is that of obtaining sufficient totally random numbers to substitute in equations describing such stochastic processes. Tables of "random" numbers have been published; computer programs to calculate "pseudo-random" numbers have been developed; hardware based upon the use of "white noise" or radioactive decay to generate digital numbers or analogs of numbers are presently available. However, these devices all suffer from definite, and occasionally, crippling disadvantages. Tables, assuming the numbers they contain are in themselves random (and this depends on the method used in generating the table) are only random until the table is exhausted, at which time if the table is repeated they become no longer random. Computer programs, as the programmers will readily admit, are generally somewhat less than desirable because they require computer time to obtain the numbers and are not really random in the most truly mathematical sense of the word. Hardware using naturally occurring stochastic processes ("white noise," radioactive decay, etc.) generally suffer from one or more of several disadvantages. Most of them will have a "spectral distribution" wherein all possible numbers of the available set are not equally probable, but their relative probabilities are known provided enough numbers are generated and the known spectral distribution can be divided out. However, for digital computer use, many of these devices are slow and laborious, causing essentially the same sort of delays inherent in the computer programs used to create "pseudo-random" numbers. Also, many of these systems are bulky, require much equipment, include delicate or sensitive devices difficult to maintain.

In view of these deficiencies we have invented a generator for the generation of random entities utilizing multiple noise generators in a configuration which eliminates the spectral distribution problem and reduces equipment and process complexity. The device operates at very high counting rates and therefore is able to produce random pulses at a very rapid rate (of the order of $10^7$ pulses per second). By detecting randomness of noise emanations with respect to position rather than time the problem of spectral distribution of emanations is eliminated.

It is therefore an object of this invention to provide a generator of truly mathematically random entities.

Another object of this invention is to provide a generator for generating random numbers at a very fast rate.

Still further, it is an object of this invention to provide a less expensive random number generator.

Other objects and many of the attendant advantages of this invention will be readily appreciated as the same becomes better understood by reference to the following detailed description of one possible application, to be considered in connection with the accompanying drawing wherein the single figure is a schematic diagram of a random number generator according to the present invention.

In order to better understand the operation of the system described in the figure, a description of its components is first presented. In the figure there is shown a pulse generator 5 having two currently available solid-state ionizing radiation detectors 7 and 9 such as the silicon surface barrier detector. A radioactive disc 11 is sandwiched between the detectors 7 and 9 in a four-pi geometry configuration, that is, one detector observes the emanations from one side of the source, and the other detector observes the emanations from the other side of the source. Due to the randomness of the radioactivity, the detector 7 and detector 9 pulses are produced in a completely random fashion. That is, assuming equal counting rates in the two detectors there is at any time whatsoever an exactly equal probability that the next pulse that occurs will be produced in either detector 7 or detector 9. A power supply 13 provides operating voltage for detectors 7 and 9. The output of detector 7 is connected to a miniaturized solid-state preamplifier 15 while the output of detector 9 is connected to preamplifier 17. The preamplifiers will produce at their output a spectrum of pulses characteristic of the type of radiation detector and type of emanation from the source. The output of amplifier 15 is connected to the "set" input of the first stage of shift register 19. The output of amplifier 17 is connected to the croresponding "reset" input of shift register 19 through a discriminator 21. The output of amplifier 15 and the output of discriminator 21 are connected to the inputs of "or" gate 23. The output of "or" gate 23 is connected to the input of delay line 25 which has its output connected to an input of coincidence reject gate 27 which has two other inputs connected respectively in common with the set and reset inputs of shift register 19. The pulse output of shift register 19 is connected to an input of integrator network 29 which has an output connected to discriminator 21 for control thereof.

OPERATION

Assume for the moment that the number of pulses per second from both detectors 7 and 9, which are capable of triggering the shift register 19 and "or" gate 23, are exactly equal. As pulses are produced by the two detectors 7 and 9 the shift register 19 will fill with binary digits, and because the two count rates are exactly equal, there will be placed in the shift register, over a given length of time, exactly as many "1" digits or "bits" as "0" bits, within a certain predictable difference depending only on the total number of bits, both "1's" and "0's," produced. However, the most important and crucial point to be made here is: after a given detector pulse has been produced and recorded in the shift register, it is impossible by any means whatever to predict which detector will produce the next pulse. After each bit has been produced and stored in the shift register, whether it be a "1" or a "0," there are exactly equal probabilities of the next bit being either "1" or "0." Thus a sequence of completely random binary digits is generated exactly as if one were to toss a fair coin repeatedly and store the result of each toss in the shift register.

The same "set" or "reset" signal, whichever it may be, that is fed to register 19 is also fed to "or" gate 23 and on through delay line 25 (which allows time for the register to "set" or "reset" depending upon the case) to the shift input of register 19 after passing through coincidence reject gate 27. The coincidence reject gate 27 prevents register 19 from accepting information from the detectors in the ambiguous case that both detectors produce pulses simultaneously. The speed at which numbers are generated depends on how active the radioactive source 11 is, and how often a completely new number is needed depends on the size of the binary word and the minimum cycle time of the computer or utilization device. Thus, for instance, in a Monte Carlo calculation, if a computer contained this device as "on-line" hardware, each time the computer program required a random variable it would present the proper operation code to the computer operations center, which then would direct a buffer unit to receive the next complete number from the shift register, transfer this number into the proper memory location or arithmetic register, and continue with its program of computation.

It should be noted that it was assumed above that there were equal count rates in both detectors. If the count rates are not reasonably equal, there will not be equal probabilities of "1's" and "0's," and the resulting set of numbers will have a spectral distribution which is not totally flat (i.e., all numbers produced in equal amounts). Thus, a situation analogous to other random number generators exists which have spectral distributions which must be divided out. To avoid this, it is desirable to have equal count rates in the two detectors 7 and 9. There are several ways to do this: one way would be to use a monoenergetic alpha radiation source, so that the resulting pulses from detectors would be more or less constant in amplitude. Then a simple threshold discriminator could be used to cut out noise, allowing only pulses from actual detected particles to trigger the shift register. A simple thumb-screw adjustment on the source 11 between detectors 7 and 9 to position closer or further away from one detector or the other would permit adjustment of the relative count rates.

Another scheme, as shown in the figure, would involve the use of a source-detector combination whose output would consist of pulses of all amplitudes and not just a single amplitude as described above. The last stage of the shift register 19 supplies a series of rectangular pulses as the binary digits are shifted thru the register. If the count rates are exactly equal, the time-average of this train of pulses, computed by integrating network 29, will be a potential exactly halfway between the high voltage and low voltage levels of the pulse train. The signal output of network 29 feeds a variable-level discriminator 21 which is connected in one detector channel and automatically adjusts the count rates to keep them equal. As signal sources in this last described scheme two noise generators of any kind whatever would be equally as suitable as the radioactive source, but they would probably be more complex or less stable.

The discussion above has been related to a "coin-flipper" operation to generate mathematically random numbers for use in digital computers. By use of somewhat different electronics, generators using the multiple noise sources are possible which will produce pulses of random timing, random amplitude, random width, or a combination of these. It is also conceivable to have a "random function generator" for use in certain applications of analog computers. Furthermore, by some alterations in geometry, utilizing additional noise sources, and introducing some additional sophistication and complication in the electronics, the device could be of more than two states instead of the "coin-flipper" described above, using six noise sources one could have an electronic analog of a six-sided die. Using ten noise sources one could have a device which could produce all ten digits of the decimal number system in random sequence.

What is claimed is:

1. A generator of mathematically random entities comprising: a plurality of noise generator means for generating random electrical pulses, and utilization means having a plurality of inputs connected respectively to said plurality of noise generator means for receiving said random electrical pulses generated by said noise generator means and thereby producing mathematically random entities; wherein said noise generator means comprises: a first and a second radioactive emanations detector; a radioactive source means having a predetermined spaced relationship with respect to said detector means for producing said radioactive emanations detectable by said detector means, and each of said detectors having an electrical output means connected to said utilization means; wherein said utilization means comprises a binary shift register having "set," "reset" and "shift" inputs, said outputs of said first and second detectors being connected respectively to said "set" and "reset" inputs of said shift register; a shift signal gating means having an output connected to said shift input of said register, and said shift signal gating means having an input means connected to said outputs of said first and second detectors whereby said random pulses generated by said detector means are stored as random binary numbers in said shift register.

2. A generator of mathematically random entities as set forth in claim 1 wherein said shift signal gating means comprises an "or" gate circuit having a first and second input and an output, said first input of said "or" gate being connected to said "set" input of said shift register, said second input of said "or" gate being connected to said "reset" input of said shift register; a coincidence reject gate having a first, second, and third input and an output, said output of said reject gate being connected to said "shift" input of said shift register, said first input being connected to said first input of said "or" gate, said second input being connected to said second input of said "or" gate; and a delay line connected between said output of said "or" gate and said third input of said reject gate whereby a pulse which "sets" or "resets" said shift register is gated and delayed to said "shift" input of said shift register to cause said register to shift.

3. A generator of mathematically random entities as set forth in claim 2 further comprising an integrating network having an input and an output, said input being connected to an output of said shift register; a discriminator circuit connected in series with one of said amplifier means for providing equal count rates on pulses going into said "set" and "reset" inputs of said shift register, and said discriminator having an auxiliary input connected to said output of said integrating network for control of said discriminator responsive to said integrating network.

References Cited

UNITED STATES PATENTS

| | | | |
|---|---|---|---|
| 2,539,014 | 1/1951 | Frantz | 178—22 |
| 2,913,669 | 11/1959 | Hebert | 331—78 |
| 3,366,779 | 1/1968 | Catherall et al. | 178—22 |
| 3,373,245 | 3/1968 | Newby et al. | 178—22 |

THOMAS A. ROBINSON, *Primary Examiner.*

U.S. Cl. X.R.

331—78; 340—168, 345